US010091097B2

(12) United States Patent
Lin (10) Patent No.: US 10,091,097 B2
(45) Date of Patent: Oct. 2, 2018

(54) TRANSMISSION PATH OPTIMIZATION METHOD AND SOFTWARE-DEFINED NETWORKING CONTROLLER USING THE METHOD

(71) Applicant: NANNING FUGUI PRECISION INDUSTRIAL CO., LTD., Nanning (CN)

(72) Inventor: Shih-Neng Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 91 days.

(21) Appl. No.: 15/336,755

(22) Filed: Oct. 27, 2016

(65) Prior Publication Data

US 2018/0123948 A1    May 3, 2018

(51) Int. Cl.
*H04L 12/707* (2013.01)
*H04L 12/751* (2013.01)
*H04L 29/06* (2006.01)
*H04L 29/08* (2006.01)
*H04L 12/24* (2006.01)

(52) U.S. Cl.
CPC .............. *H04L 45/24* (2013.01); *H04L 41/00* (2013.01); *H04L 45/02* (2013.01); *H04L 67/141* (2013.01); *H04L 69/16* (2013.01)

(58) Field of Classification Search
CPC ................................. H04L 45/24; H04L 45/02
See application file for complete search history.

(56) References Cited

U.S. PATENT DOCUMENTS

| | | | |
|---|---|---|---|
| 2014/0241366 A1* | 8/2014 | Smith | H04L 45/24 370/392 |
| 2015/0063112 A1 | 3/2015 | Wu et al. | |
| 2015/0124812 A1* | 5/2015 | Agarwal | H04L 45/24 370/392 |
| 2018/0019940 A1* | 1/2018 | Sheu | H04L 45/128 |

FOREIGN PATENT DOCUMENTS

| | | |
|---|---|---|
| TW | 201214187 A | 4/2012 |
| TW | 201325103 A | 6/2013 |
| TW | 201613313 A | 4/2016 |

* cited by examiner

*Primary Examiner* — Feben Haile
(74) *Attorney, Agent, or Firm* — ScienBiziP, P.C.

(57) ABSTRACT

A transmission path optimization method for a Multipath Transmission Control Protocol (MPTCP) applied in a software-defined networking controller located in a network topology. The method is based on detected MPTCP information, the SDN controller retrieves and selects one or more optimal routing paths for allocating to sub-flows of the MPTCP connection. The one or more routing paths are obtained from a first disjoint-path-set with highest compatibility.

14 Claims, 8 Drawing Sheets

TRANSMISSION PATH OPTIMIZATION METHOD AND SOFTWARE-DEFINED NETWORKING CONTROLLER USING THE METHOD

FIELD

The subject matter herein generally relates to communication technologies, especially to a transmission path optimization method based on software-defined networking (SDN) and a controller using the method.

BACKGROUND

The Multipath Transmission Control Protocol (MPTCP) is an effort towards enabling the simultaneous use of several IP-addresses/interfaces by a modification of TCP that presents a regular TCP interface to applications, while in fact spreading data across several sub-flows. Benefits of this include better resource utilization, better throughput, and smoother reaction to failures.

The core idea of the MPTCP is to add an MPTCP layer between an application layer and a transport layer to support multi-path transmission. Traditional TCP data can be divided and distributed into several sub-flows each of which is transmitted along a different routing path.

The MPTCP is an end-to-end protocol between two hosts. The two hosts can establish or add sub-flows according to available IP addresses of the two hosts and available interfaces of the two hosts, and randomly allocate a routing path for each of the sub-flows. If routing paths are allocated randomly, the transmission quality of a routing path may be weak, which may affect transmission efficiency and result in network congestion.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

References to "an" or "one" exemplary embodiment in this disclosure are not necessarily to the same exemplary embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Figure 1:
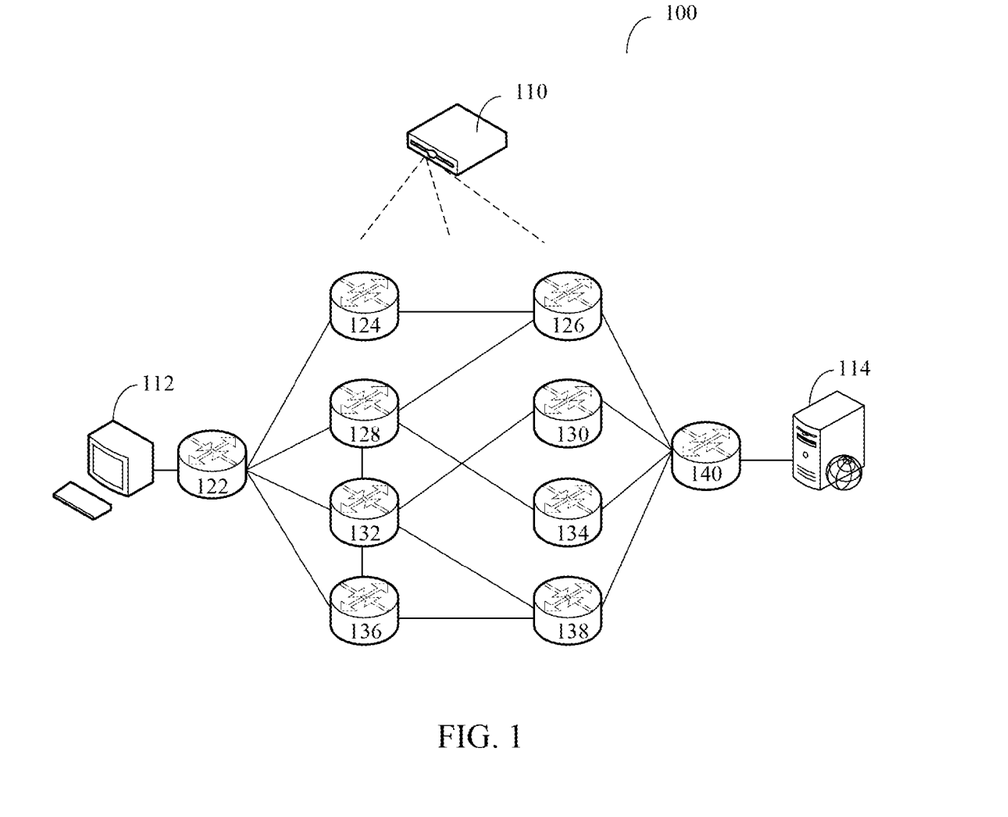
FIG. 1 illustrates an exemplary embodiment of a network topology.

FIG. 1 illustrates an exemplary embodiment of a network topology 100. The network topology 100 includes at least one SDN controller 110, network devices (e.g., a first network device 112, a second network device 114), and switch devices (e.g., 122, 124, 126, 128, 130, 132, 134, 136, 138, 140). Exemplary embodiments of the network devices 112-114 may be include laptop computers, smart mobile phones, tablet personal computers, set top boxes, servers, or the like, all of which support MPTCP. Exemplary embodiments of the switch devices 122-140 may include switches, routers, access points, or the like, all of which can be controlled by the SDN controller 110 based on the OpenFlow standard protocol.

In the exemplary embodiment, the SDN controller 110 detects MPTCP information in the network topology 100, such as information for establishing an MPTCP connection (hereinafter, MPTCP session), information for adding a sub-flow, information for deleting a sub-flow, and the like. Based on the detected MPTCP information, the SDN controller 110 can allocate a routing path for a sub-flow of an MPTCP session, can re-configure a new routing path for a sub-flow of the MPTCP session, can delete a sub-flow of the MPTCP session, and the like.

Figure 2:
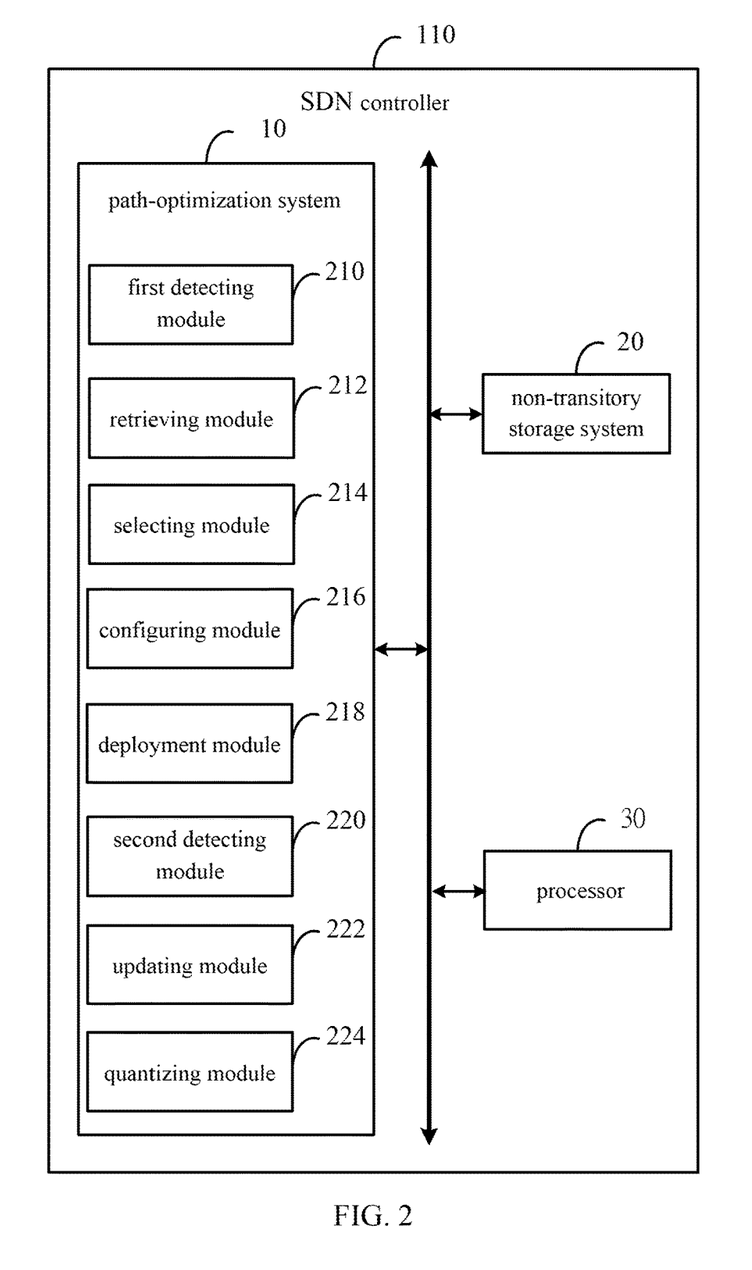
FIG. 2 illustrates a block diagram of an exemplary embodiment of functional modules of an SDN controller.

FIG. 2 illustrates an exemplary embodiment of function modules of the SDN controller 110. The SDN controller 110 includes a path-optimization system 10, a non-transitory storage system 20, and at least one processor 30. The SDN controller 110 includes a first detecting module 210, a retrieving module 212, a selecting module 214, a configuring module 216, a deployment module 218, a second detecting module 210, an updating module 222, and a quantizing module 224. The modules 210-224 are configured to be executed by one or more processors (e.g., by the processor 30) to achieve functionality. The non-transitory storage system 20 can store code and data as to the path-optimization system 10.

A first sub-flow of an MPTCP session can be established in the following manner.

The first detecting module 210 detects handshaking information for establishing multipath transmission control protocol (MPTCP) session between two network devices, for example, between the first network device 112 and the second network device 114. The handshaking information for establishing the MPTCP session is composed of three-way handshaking messages (i.e., TCP SYN, SYN+ACK, ACK) with MP_CAPABLE option. The MPTCP session is being established between the first network device 112 and the second network device 114 if the three-way handshaking messages are detected.

Through the deployment module 218, the first detecting module 210 pre-applies a policy flow for detecting the MPTCP information in relation to the switch devices (e.g., 122, 140). The switch devices which receive the policy flow forward packets relevant to the MPTCP information, and upload and report the MPTCP information to the SDN controller 110.

The retrieving module 212 retrieves routing paths between the first network device 112 and the second network device 114 according to the network topography 100, and retrieves a plurality of first candidate disjoint-path-sets. Each first candidate disjoint-path-set comprises at least two candidate routing paths selected from the routing paths, wherein the candidate routing paths do not share a common routing path.

Figure 3:
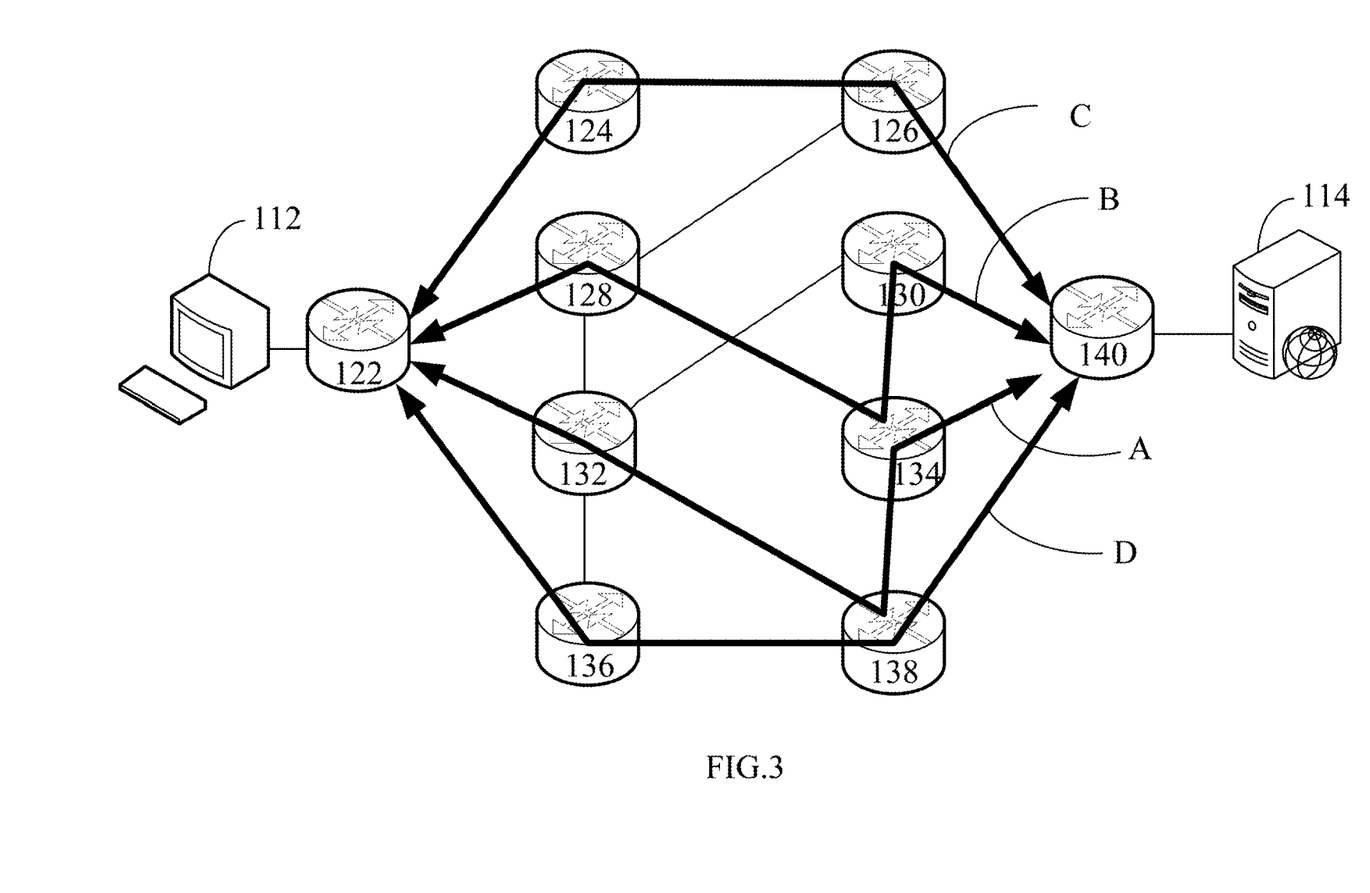
FIG. 3 illustrates a diagrammatic view of an exemplary embodiment of routing paths retrieved from the network topology of FIG. 1 using a Ford-Fulkerson algorithm.

In the exemplary embodiment illustrated in FIG. 3, between the first network device 112 and the second network device 114, four routing paths can be retrieved by the retrieving module 212 using a Ford-Fulkerson algorithm. The four routing paths do not share a common path. Thus there is no common path between any two of the four routing paths which include a first routing path A (hereinafter, Path-A), a second routing path B (hereinafter, Path-B), a third routing path C (hereinafter, Path-C), and a fourth routing path D (hereinafter, Path-D). The four routing paths can be divided into six first candidate disjoint-path-sets each of which includes two candidate routing paths selected from the four routing paths (i.e., (A, B), (A, C), (A, D), (B, C), (B, D) and (C, D)). The four routing paths can be divided into four first candidate disjoint-path-sets each of which includes three candidate routing paths selected from the four routing paths (i.e., (A, B, C), (A, B, D), (A, C, D), (B, C, D)). The number of candidate routing paths in each candidate disjoint-path-set can be set by user.

In one exemplary embodiment, all routing paths between the first network device 112 and the second network device 114 can be retrieved by the retrieving module 212. According to a predefined number of candidate routing paths in each candidate disjoint-path-set, all the routing paths can be divided into a plurality of first candidate disjoint-path-sets, each of which includes the predefined number of candidate routing paths.

The selecting module 214 selects a first disjoint-path-set with highest compatibility from the first candidate disjoint-path-sets, wherein the first disjoint-path-set includes a first routing path (i.e., Path-A).

The compatibility of each first candidate disjoint-path-set is determined according to multiple factors, such as total transmission quality of candidate routing paths in the first candidate disjoint-path-set, and transmission quality difference between candidate routing paths in the first candidate disjoint-path-set. In the exemplary embodiment, the first disjoint-path-set with highest compatibility indicates that transmission quality of each routing path in the set is good and transmission qualities between the routing paths in the set are similar. In one exemplary embodiment, the quantizing module 224 is provided to implement quantization of compatibility of each of the first candidate disjoint-path-sets to obtain a compatibility value of each of the first candidate disjoint-path-sets. An exemplary embodiment of the quantizing module 224 is as follows.

Figure 4:
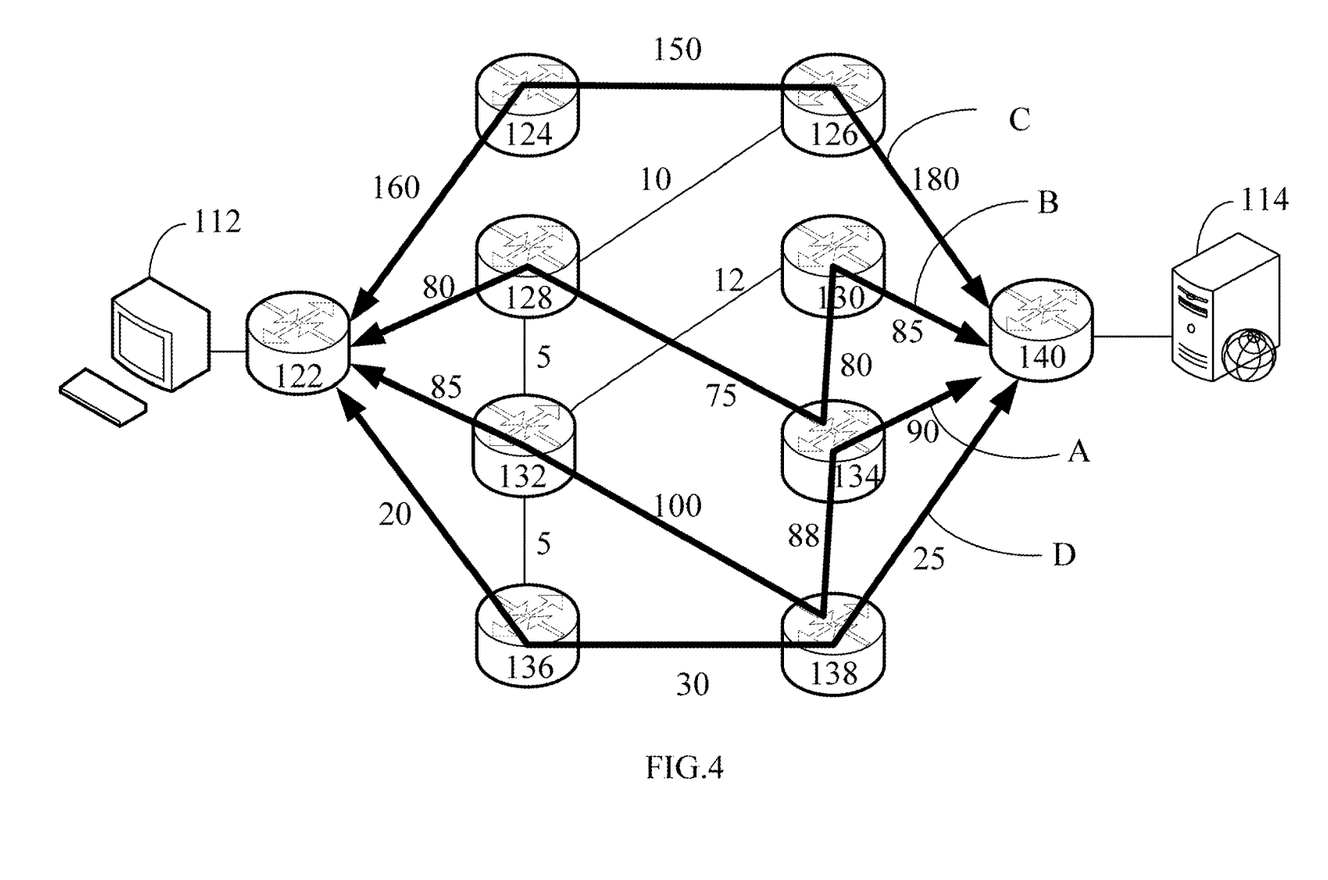
FIG. 4 illustrates a diagrammatic view of an exemplary embodiment of bandwidth of the routing paths of FIG. 3.

Each first candidate disjoint-path-set may include two candidate routing paths selected from the routing paths (e.g., Path-A-Path-D illustrated in FIG. 3). The compatibility value of a first candidate disjoint-path-set is a product of sum of available bandwidths of two candidate routing paths and ratio of available bandwidths of the two candidate routing paths. Here, the ratio of available bandwidths of the two candidate routing paths is not larger than 1. The equation to calculate the compatibility value (hereinafter CV) is represented as: $CV_{(\alpha, \beta)}=$(Available Bandwidth$_\alpha$+Available Bandwidth$_\beta$)*(Available Bandwidth$_\alpha$+Available Bandwidth$_\beta$), where $\alpha$ and $\beta$ can be dynamically adjusted. Referring to FIG. 4, available bandwidth of the Path-C is 150 and available bandwidth of the Path-D is 20. Thus, $CV_{(C, D)}=$(Available Bandwidth$_C$+Available Bandwidth$_D$)*(Available Bandwidth$_C$+Available Bandwidth$_D$)=(150+20)*(20/150)=22.61.

If each first candidate disjoint-path-set includes at least three candidate routing paths selected from the routing paths (e.g., Path-A-Path-D), compatibility value of a candidate disjoint-path-set is an average value of compatibility values of two of the at least three candidate routing paths in the set. Referring to FIG. 4, $CV_{(A, B, D)}=(CV_{(A, B)}+CV_{(A, D)}+CV_{(B, D)})/3$.

If the predefined number of candidate routing paths in each candidate disjoint-path-set is 2, compatibility value of the first disjoint-path-set which is composed of the Path-A and the Path-B $CV_{(A, B)}$ is larger than that of any one of the other first candidate disjoint-path-sets.

If the predefined number of candidate routing paths in each disjoint-path-set is 3, the compatibility value of the first disjoint-path-set which is composed of the first routing path A, the second routing path B, and the third routing path C $CV_{(A, B, C)}$ is larger than that of any one of the other first candidate disjoint-path-sets.

Therefore, if the predefined number of candidate routing paths in each disjoint-path-set is 2, the selecting module 214 selects the first disjoint-path-set (including the Path-A and the Path-B) from all the first candidate disjoint-path-sets. If the predefined number of candidate routing paths in each disjoint-path-set is 3, the selecting module 214 selects the first disjoint-path-set (including the Path-A, the Path-B, and the Path-C) from all the first candidate disjoint-path-sets.

The configuring module 216 configures the Path-A for the first sub-flow of the MPTCP session, the Path-A having the best transmission quality in the first disjoint-path-set.

The deployment module 260 generates a first policy flow for the first sub-flow and applies the first policy flow to SDN switch devices associated with the Path-A, according to the OpenFlow protocol. In the exemplary embodiment, the first policy flow is generated according to the Path-A and is applied to SDN switch devices on the Path-A (i.e., 122, 132, 138, 134, and 140).

Establishment of a second sub-flow of the MPTCP session is as follows.

The first detecting module 210 detects handshaking information for adding the second sub-flow of the MPTCP session. The handshaking information for adding the second sub-flow of the MPTCP session is composed of three-way handshaking messages (i.e., TCP SYN, SYN+ACK, ACK) with MP_JOIN option.

The configuring module 216 configures the Path-B for the second sub-flow of the MPTCP session. The Path-B is provided from the first disjoint-path-set, the first disjoint-path-set includes the Path-B and is selected from all the first candidate disjoint-path-sets which were considered when establishing the first sub-flow.

The deployment module 218 generates a second policy flow for the second sub-flow and applies the second policy flow to SDN switch devices associated with the Path-B (i.e., 122, 128, 134, 130 and 140).

Establishment of a third sub-flow of the MPTCP session is as follows.

If each of the first candidate disjoint-path-sets includes two candidate routing paths, the first disjoint-path-set including the Path-A and the Path-B is selected in the stage of establishing the first sub-flow. This cannot provide a desired routing-path for the third sub-flow.

The first detecting module 210 detects handshaking information for adding the third sub-flow of the MPTCP session. The handshaking information for adding the third sub-flow of the MPTCP session is composed of three-way handshaking messages (i.e., TCP SYN, SYN+ACK, ACK) with MP_JOIN option.

The retrieving module 212 retrieves third candidate routing paths where no common routing path is shared with the Path-A and the Path-B. Referring to FIG. 3, the third candidate routing paths includes the Path-C and the Path-D.

The selecting module 214 selects a third routing path (i.e., the Path-C) from the third candidate routing paths (i.e., the Path-C and the Path-D), wherein the Path-C has highest compatibility with the Path-A and the Path-B.

In the exemplary embodiment, the quantizing module 224 is utilized: $(CV_{(a, b)}+CV_{(a, c)})/2>(CV_{(d, b)}+CV_{(d, c)}/2$. Compared with the Path-D, the Path-C has higher compatibility with the Path-A and the Path-B.

The configuring module 216 configures the Path-C for the third sub-flow of the MPTCP session.

The deployment module 218 generates a third policy flow for the third sub-flow and applies the third policy flow to SDN switch devices associated with the Path-C (i.e., 122, 124, 126, and 140).

Another exemplary embodiment of establishing a third sub-flow of the MPTCP session is described.

Each of the first candidate disjoint-path-sets comprises at least three candidate routing paths selected from the routing paths (e.g., Path-A-Path-D as illustrated in FIG. 3). The selecting module 214 selects the first disjoint-path-set including the Path-A, the Path-B, and the Path-C which were considered when establishing the first sub-flow. Path-C can be provided for the third sub-flow.

The first detecting module 210 detects handshaking information for adding the third sub-flow of the MPTCP session.

The configuring module 216 configures the Path-C for the third sub-flow of the MPTCP session.

The deployment module 218 generates a third policy flow for the third sub-flow and applies the third policy flow to SDN switch devices associated with the Path-C.

Deleting or updating of a sub-flow of the MPTCP session is as follows.

The second detecting module 220 detects transmission quality of each of sub-flows of the MPTCP session. In the exemplary embodiment, the second detecting module 220 can analyze transmission quality of each of the sub-flows according to multiple factors. The factors include a round-trip time (RTT), a packet lost ratio, an available bandwidth, a receiving window (RWIN), and the like.

In one exemplary embodiment, the second detecting module 220 further analyzes transmission quality tendency of each of the sub-flows. Transmission quality tendency of a sub-flow can be utilized as one of factors determining whether the sub-flow is to be deleted or to be re-configured with a new routing path.

When the transmission quality of at least one of the sub-flows is less than a predefined value, the configuring module 220 deletes the at least one sub-flow, or re-configures at least one routing path for the at least one sub-flow. In the exemplary embodiment, one or more sub-flows (e.g., the first sub-flow, the second sub-flow, and the third sub-flow) have been established in the MPTCP session. If detecting of the second sub-flow shows that its transmission quality is less than the predefined value, the configuring module 220 may delete the second sub-flow or re-configure a new routing path for the second sub-flow. For example, if the transmission quality of the Path-D is better than that of the Path-B, the configuring module 220 can re-configure the second sub-flow with the Path-D (transmission quality of each of the sub-flows can dynamically change with change of status of the network topology 100).

The deployment module 218 generates a fourth policy flow according to a deleting operation or a re-configuring operation, and applies the fourth policy flow to SDN switch devices associated with the fourth policy. When the re-configuring operation is executed, the fourth policy flow is applied to the switch devices of the Path-D. It is also applied to the switch devices of the Path-B to notify the switch devices of the Path-B upon deletion of the second policy flow. When the deleting operation is executed, the fourth policy flow is applied to the path-start and the path-end switch devices of the Path-B, for triggering the path-start and the path-end switch devices to transmit an RST message or a FIN message to the first network device 112 or the second network device 114.

Deleting or updating of a sub-flow of the MPTCP session is as follows.

If the fourth policy flow for deleting the at least one sub-flow (e.g., the second sub-flow) is implemented, the updating module 222 may re-configure new routing paths for remaining sub-flows of the MPTCP session (i.e., the first sub-flow and the third sub-flow). An exemplary embodiment of the updating module 222 retrieves a plurality of second candidate disjoint-path-sets according to the network topology and the number of the remaining sub-flows of the MPTCP session. A second disjoint-path-set with highest compatibility is selected from the plurality of second candidate disjoint-path-sets. The remaining sub-flows of the MPTCP session are reconfigured according to routing paths of the second disjoint-path-set and a fifth policy flow for the remaining sub-flows of the MPTCP session is generated. The fifth policy flow is applied to SDN switch devices associated with the fifth policy flow.

In its exemplary embodiments, the SDN controller 112 obtains real-time network topology information and configures optimal routing paths for sub-flows of the MPTCP to reduce network congestion, based on the OpenFlow standard protocol (e.g., ONF-OFPI).

In one exemplary embodiment, the SDN controller 112 further establishes a connection information table for recording information of each sub-flow of the MPTCP session. Information of each sub-flow includes token, addr.ID, Src-IP, Src-Port, Dst-IP and Dst-Port.

In one exemplary embodiment, the SDN controller 112 further detects other information between the first network device 112 and the second network device 114, such as ADD_ADDR messages, REMOVE_ADDR messages, and the like.

Figure 5A:
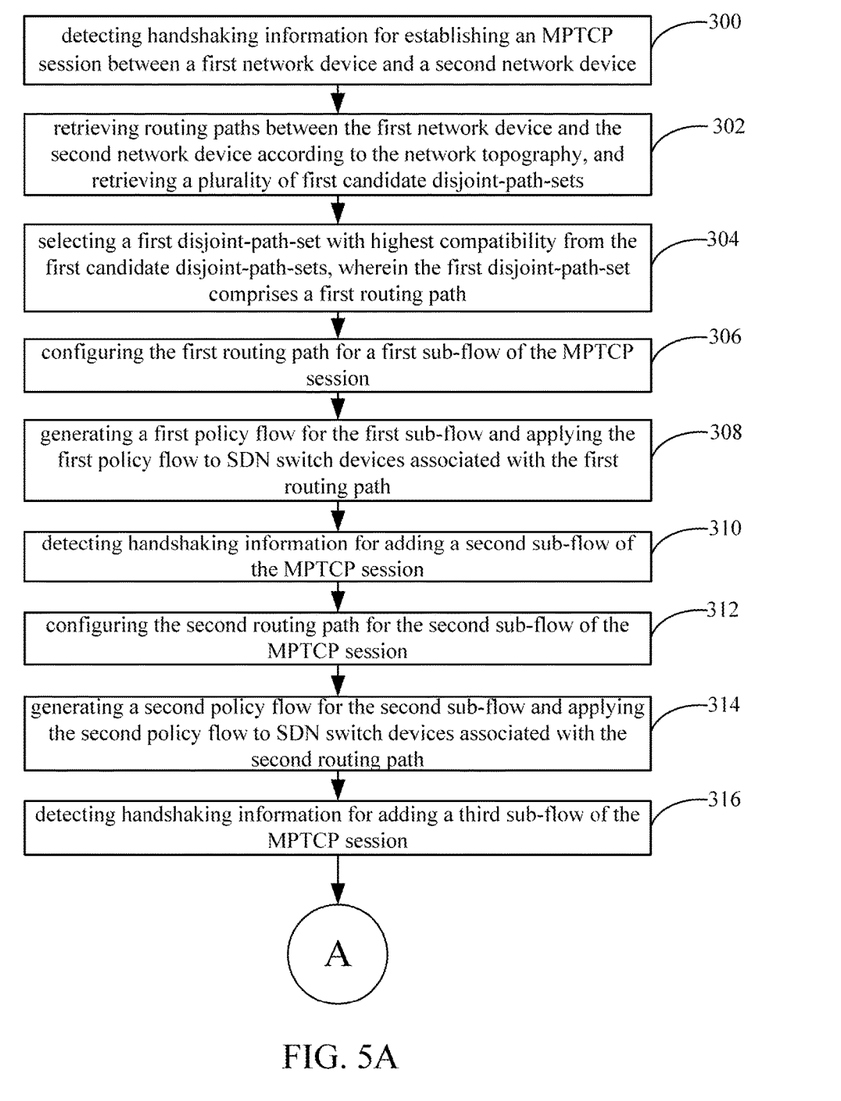
FIGS. 5A-5B illustrate a flowchart of an exemplary embodiment of a transmission path optimization method.
Figure 5B:
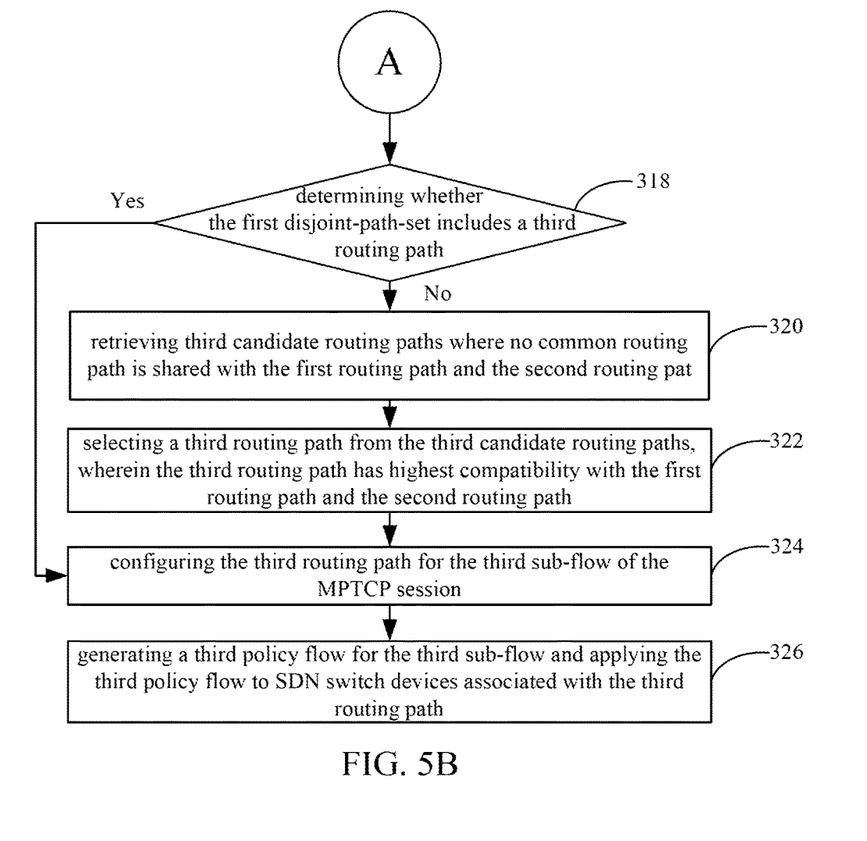

Referring to FIG. 5, a flowchart is presented in accordance with an example exemplary embodiment of a transmission path optimization method. The transmission optimizing method is provided by way of example, as there are a variety of ways to carry out the method. The method described below can be carried out using the configurations illustrated in FIG. 2, for example, and various elements of these figures are referenced in explaining the method. Each block shown in FIGS. 5A-5B represents one or more processes, methods, or subroutines, carried out in the method. Additionally, the illustrated order of blocks is by example only and the order of the blocks can change. The method can begin at 300.

At block 300, the SDN controller 112 detects handshaking information for establishing a MPTCP session between a first network device and a second network device.

At block 302, the SDN controller 112 retrieves routing paths between the first network device and the second network device according to the network topography, and retrieves a plurality of first candidate disjoint-path-sets. Each first candidate disjoint-path-set comprises at least two candidate routing paths selected from the routing paths, wherein the candidate routing paths do not share a common routing path.

At block 304, the SDN controller 112 selects a first disjoint-path-set with highest compatibility from the first candidate disjoint-path-sets, wherein the first disjoint-path-set comprising a first routing path.

At block 306, the SDN controller 112 configures the first routing path for a first sub-flow of the MPTCP session.

At block 308, the SDN controller 112 generates a first policy flow for the first sub-flow and applies the first policy flow to SDN switch devices associated with the first routing path.

The blocks 300-308 are utilized for establishing the first sub-flow of the MPTCP session.

At block 310, the SDN controller 112 detects handshaking information for adding a second sub-flow of the MPTCP session.

At block 312, the SDN controller 112 configures the second routing path for the second sub-flow of the MPTCP session.

At block 314, the SDN controller 112 generates a second policy flow for the second sub-flow and applies the second policy flow to SDN switch devices associated with the second routing path.

The blocks 310-314 are utilized for establishing the second sub-flow of the MPTCP session.

At block 316, the SDN controller 112 detects handshaking information for adding a third sub-flow of the MPTCP session.

At block 318, the SDN controller 112 determines whether the first disjoint-path-set selected in the block 304 includes a third routing path. If no, the flowchart goes to block 320; if yes, the flowchart goes to block 324.

At block 320, the SDN controller 112 retrieves third candidate routing paths where no common routing path is shared with the first routing path and the second routing path.

At block 322, the SDN controller 112 selects a third routing path from the third candidate routing paths, wherein the third routing path has highest compatibility with the first routing path and the second routing path.

At block 324, the SDN controller 112 configures the third routing path for a third sub-flow of the MPTCP session.

At block 326, the SDN controller 112 generates a third policy flow for the third sub-flow and applies the third policy flow to SDN switch devices associated with the third routing path.

The blocks 316-326 are utilized for establishing the third sub-flow of the MPTCP session.

It will be understood that the exemplary embodiments given here are just examples, the same idea apply to establish a fourth sub-flow, a fifth sub-flow and subsequent sub-flows according to establishment of the second sub-flow and of the third sub-flow.

Figure 6:
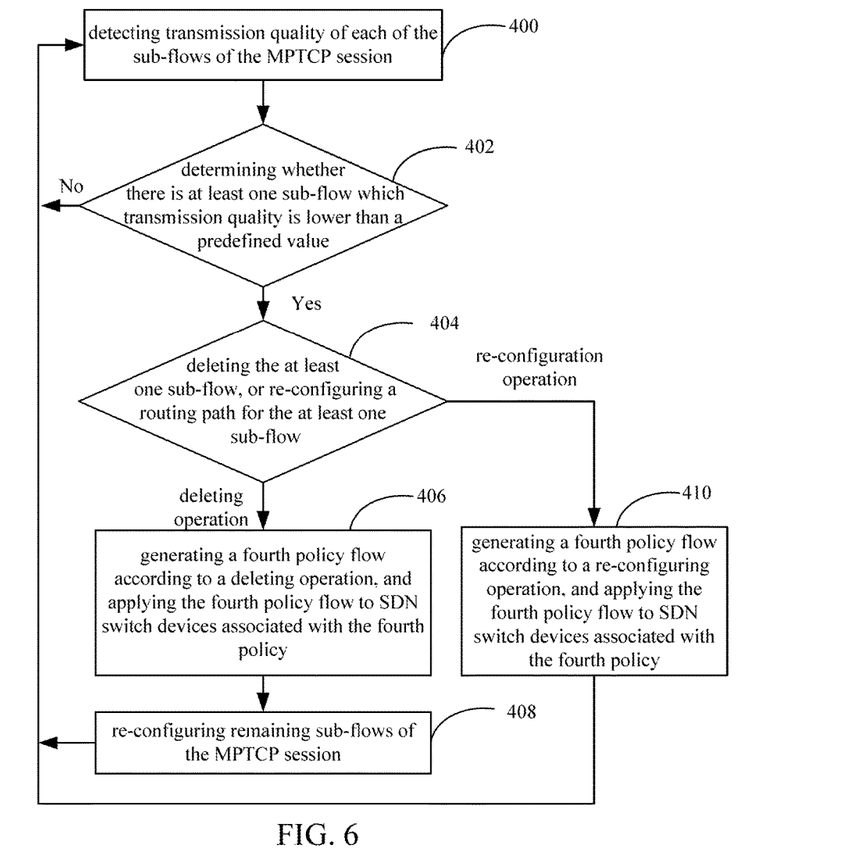
FIG. 6 illustrates a flowchart of another exemplary embodiment of a transmission path optimization method.

Referring to FIG. 6, a flowchart of a further method (transmission path optimization method). The method can begin at 400.

At block 400, the SDN controller 112 detects transmission quality of each of the sub-flows of the MPTCP session.

At block 402, the SDN controller 112 determines whether there is at least one sub-flow which transmission quality is lower than a predefined value. If yes, the flowchart goes to block 404; if no, the flowchart goes to block 400.

At block 404, the SDN controller 112 deletes the at least one sub-flow, or re-configures a new routing path for the at least one sub-flow. If the deleting operation is executed, the flowchart goes to block 406; if the re-configuring operation is executed, the flowchart goes to block 410.

At block 406, the SDN controller 112 generates a fourth policy flow according to a deleting operation, and applies the fourth policy flow to SDN switch devices associated with the fourth policy.

At block 408, the SDN controller 112 re-configures remaining sub-flows of the MPTCP session. The block 408 includes blocks 500-506 illustrated in FIG. 7.

Figure 7:
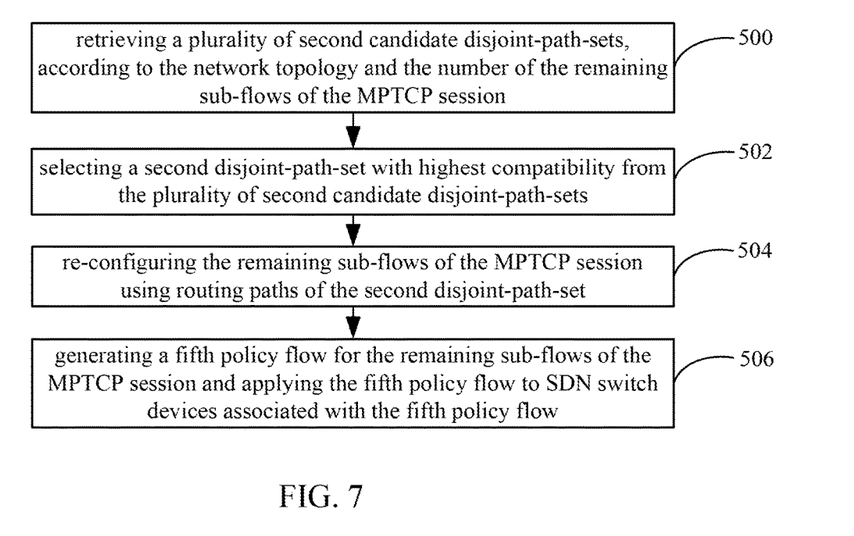
FIG. 7 illustrates a flowchart of an exemplary embodiment of an updating step of the transmission path optimization method of FIG. 6.

At the block 500, the SDN controller 112 retrieves a plurality of second candidate disjoint-path-sets according to the network topology and the number of the remaining sub-flows of the MPTCP session. At the block 502, the SDN controller 112 selects a second disjoint-path-set with highest compatibility from the plurality of second candidate disjoint-path-sets. At the block 504, the SDN controller 112 re-configures the remaining sub-flows of the MPTCP session using routing paths of the second disjoint-path-set. At the block 506, the SDN controller 112 generates a fifth policy flow for the remaining sub-flows of the MPTCP session and applies the fifth policy flow to SDN switch devices associated with the fifth policy flow. The flowchart goes back to block 400.

At block 410, the SDN controller 112 generates a fourth policy flow according to a re-configuring operation, and applies the fourth policy flow to SDN switch devices associated with the fourth policy. The flowchart goes back to block 400.

The exemplary embodiments shown and described above are only examples. Many details are often found in the art such as the other features of a network detection system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A transmission path optimization method, executable by a processor of software-defined networking (SDN) controller located in a network topology, the method comprising:
when handshaking information for establishing a multi-path transmission control protocol (MPTCP) session between a first network device and a second network device is detected:
retrieving routing paths between the first network device and the second network device according to the network topography, and retrieving a plurality of first candidate disjoint-path-sets each of which comprises at least two candidate routing paths selected from the routing paths, wherein the candidate routing paths do not share a common routing path;
selecting a first disjoint-path-set with highest compatibility from the first candidate disjoint-path-sets, wherein the first disjoint-path-set comprises a first routing path;
configuring the first routing path for a first sub-flow of the MPTCP session; and
generating a first policy flow for the first sub-flow and applying the first policy flow to SDN switch devices associated with the first routing path.

2. The method as claimed in claim 1, wherein the first disjoint-path-set further comprises a second routing path, the method further comprising:
detecting handshaking information for adding a second sub-flow of the MPTCP session;
configuring the second routing path for the second sub-flow of the MPTCP session; and
generating a second policy flow for the second sub-flow and applying the second policy flow to SDN switch devices associated with the second routing path.

3. The method as claimed in claim 2, each of the first candidate disjoint-path-sets comprises two candidate routing paths selected from the routing paths, the method further comprising:
detecting handshaking information for adding a third sub-flow of the MPTCP session;
retrieving third candidate routing paths where no common routing path is shared with the first routing path and the second routing path;
selecting a third routing path from the third candidate routing paths, wherein the third routing path has highest compatibility with the first routing path and the second routing path;
configuring the third routing path for the third sub-flow of the MPTCP session; and
generating a third policy flow for the third sub-flow and applying the third policy flow to SDN switch devices associated with the third routing path.

4. The method as claimed in claim 1, wherein each of the first candidate disjoint-path-sets comprises at least three candidate routing paths selected from the routing paths, and the first disjoint-path-set further comprises a third routing path, the method further comprising:
detecting handshaking information for adding a third sub-flow of the MPTCP session;
configuring the third routing path for the third sub-flow of the MPTCP session; and
generating a third policy flow for the third sub-flow and applying the third policy flow to SDN switch devices associated with the third routing path.

5. The method as claimed in claim 1, further comprising:
detecting transmission quality of each of the sub-flows of the MPTCP session;
when the transmission quality of at least one of the sub-flows is less than a predefined value, deleting the at least one sub-flow, or re-configuring at least one routing path for the at least one sub-flow;
generating a fourth policy flow according to a deleting operation or a re-configuring operation, and applying the fourth policy flow to SDN switch devices associated with the fourth policy.

6. The method as claimed in claim 5, when the fourth policy flow for deleting the at least one of the sub-flows is applied, the method further comprising:
re-configuring remaining sub-flows of the MPTCP session:
retrieving a plurality of second candidate disjoint-path-sets according to the network topology and the number of the remaining sub-flows of the MPTCP session;
selecting a second disjoint-path-set with highest compatibility from the second candidate disjoint-path-sets;
re-configuring the remaining sub-flows of the MPTCP session using routing paths of the second disjoint-path-set; and
generating a fifth policy flow for the remaining sub-flows of the MPTCP session and applying the fifth policy flow to SDN switch devices associated with the fifth policy flow.

7. The method as claimed in claim 1, further comprising:
implementing quantization to compatibility of each of the first candidate disjoint-path-sets to obtain a compatibility value of each of the first candidate disjoint-path-sets;
wherein a compatibility value of a first candidate disjoint-path-set is a product of sum of available bandwidths of two candidate routing paths and ratio of available bandwidths of the two candidate routing paths, wherein the ratio of available bandwidths of the two candidate routing paths is not larger than 1, when the first candidate disjoint-path-set comprises two candidate routing paths;
the compatibility value of a first candidate disjoint-path-set is a average value of compatibility values of two of at least three candidate routing paths, when the first candidate disjoint-path-set comprises at least three candidate routing paths.

8. A SDN controller, comprising:
at least one processor;
a storage system; and
one or more programs that are stored in the storage system and executed by the at least one processor, the one or more programs comprising instructions for:
when handshaking information for establishing a multi-path transmission control protocol (MPTCP) session between a first network device and a second network device is detected:
retrieving routing paths between the first network device and the second network device according to the network topography, and retrieving a plurality of first candidate disjoint-path-sets each of which comprises at least two candidate routing paths selected from the routing paths, wherein the candidate routing paths do not share a common routing path;
selecting a first disjoint-path-set with highest compatibility from the first candidate disjoint-path-sets, wherein the first disjoint-path-set comprises a first routing path;
configuring the first routing path for a first sub-flow of the MPTCP session; and generating a first policy flow for the first sub-flow and applying the first policy flow to SDN switch devices associated with the first routing path.

9. The controller as claimed in claim 8, the first disjoint-path-set further comprises a second routing path, further comprising instructions for:
  detecting handshaking information for adding a second sub-flow of the MPTCP session;
  configuring the second routing path for the second sub-flow of the MPTCP session; and
  generating a second policy flow for the second sub-flow and applying the second policy flow to SDN switch devices associated with the second routing path.

10. The controller as claimed in claim 9, each of the first candidate disjoint-path-set comprising two candidate routing paths selected from the routing paths, further comprising instructions for:
  detecting handshaking information for adding a third sub-flow of the MPTCP session;
  retrieving third candidate routing paths where no common routing path is shared with the first routing path and the second routing path;
  selecting a third routing path from the third candidate routing paths, wherein the third routing path has highest compatibility with the first routing path and the second routing path;
  configuring the third routing path for the third sub-flow of the MPTCP session; and
  generating a third policy flow for the third sub-flow and applying the third policy flow to SDN switch devices associated with the third routing path.

11. The controller as claimed in claim 8, wherein each of the first candidate disjoint-path-sets comprises at least three candidate routing paths selected from the routing paths, and the first disjoint-path-set further comprises a third routing path, further comprising instructions for:
  detecting handshaking information for adding a third sub-flow of the MPTCP session;
  configuring the third routing path for the third sub-flow of the MPTCP session; and
  generating a third policy flow for the third sub-flow and applying the third policy flow to SDN switch devices associated with the third routing path.

12. The controller as claimed in claim 8, further comprising instructions for:
  detecting transmission quality of each of the sub-flows of the MPTCP session;
  when the transmission quality of at least one of the sub-flows is less than a predefined value, deleting the at least one sub-flow, or re-configuring at least one routing path for the at least one sub-flow;
  generating a fourth policy flow according to a deleting operation or a re-configuring operation, and applying the fourth policy flow to SDN switch devices associated with the fourth policy.

13. The controller as claimed in claim 12, when the fourth policy flow for deleting the at least one of the sub-flows is applied, further comprising instructions for:
  re-configuring remaining sub-flows of the MPTCP session:
  retrieving a plurality of second candidate disjoint-path-sets according to the network topology and the number of the remaining sub-flows of the MPTCP session;
  selecting a second disjoint-path-set with highest compatibility from the second candidate disjoint-path-sets;
  re-configuring the remaining sub-flows of the MPTCP session using routing paths of the second disjoint-path-set; and
  generating a fifth policy flow for the remaining sub-flows of the MPTCP session and applying the fifth policy flow to SDN switch devices associated with the fifth policy flow.

14. The controller as claimed in claim 8, further comprising instructions for:
  implementing quantization to compatibility of each of the first candidate disjoint-path-sets to obtain a compatibility value of each of the first candidate disjoint-path-sets;
  wherein the compatibility value of a first candidate disjoint-path-set is a product of sum of available bandwidths of two candidate routing paths and ratio of available bandwidths of the two candidate routing paths, wherein the ratio of available bandwidths of the two candidate routing paths is not larger than 1, when the first candidate disjoint-path-set comprises two candidate routing paths;
  the compatibility value of a first candidate disjoint-path-set is a average value of compatibility values of two of at least three candidate routing paths, when the first candidate disjoint-path-set comprises at least three candidate routing paths.

* * * * *